United States Patent
Bardon et al.

(10) Patent No.: US 7,214,253 B2
(45) Date of Patent: May 8, 2007

(54) FILTERING BODY COMPRISING A PLURALITY OF FILTERING UNITS, IN PARTICULAR DESIGNED FOR A PARTICULATE FILTER

(75) Inventors: Sebastien Remi Bardon, Lyons (FR); Vincent Marc Gleize, Saint-Saturnin les Avignon (FR)

(73) Assignee: Saint-Gobain Centre de Recherches et d'Etudes, Courbevoie (FR)

( * ) Notice: Subject to any disclaimer, the term of this patent is extended or adjusted under 35 U.S.C. 154(b) by 351 days.

(21) Appl. No.: 10/499,635

(22) PCT Filed: Dec. 18, 2002

(86) PCT No.: PCT/FR02/04436

§ 371 (c)(1), (2), (4) Date: Jun. 21, 2004

(87) PCT Pub. No.: WO03/053542

PCT Pub. Date: Jul. 3, 2003

(65) Prior Publication Data

US 2005/0102984 A1    May 19, 2005

(30) Foreign Application Priority Data

Dec. 20, 2001  (FR) .................................. 01 16566

(51) Int. Cl.
B01D 46/00   (2006.01)

(52) U.S. Cl. ................... 55/523; 55/DIG. 30

(58) Field of Classification Search ............ 55/282, 55/307, 315, 342, 385, 482, 484, 490, 522, 55/52, 523, DIG. 30, 483, 385.3, 385.1; 60/311
See application file for complete search history.

(56) References Cited

U.S. PATENT DOCUMENTS 4,416,676 A * 11/1983 Montierth .................... 55/523

(Continued)

FOREIGN PATENT DOCUMENTS

EP          0 698 410          2/1996

(Continued)

OTHER PUBLICATIONS

Patent Abstracts of Japan, vol. 1999, No. 9, Jul. 30, 1999 & JP 11 114339 A (NGK Insulators Ltd), Apr. 27, 1999 abstract.

(Continued)

*Primary Examiner*—Duane Smith
*Assistant Examiner*—Robert Clemente
(74) *Attorney, Agent, or Firm*—Young & Thompson

(57) ABSTRACT

A filtering body (3), in particular for a motor vehicle internal combustion engine exhaust gas particulate filter (1), includes a plurality of filtering units (11a–11i) assembled by at least a joint (12) interposed between the filtering units (11a–11i) and configured so as to counter the passage of exhaust gases between the filtering units (11a–11i). The filtering body is characterized in that the joint (12) comprises a plurality of joint portions (12a–12e) locally adapted to optimize the attenuation of thermomechanical stresses liable to be generated in the filtering body (3).

13 Claims, 1 Drawing Sheet

U.S. PATENT DOCUMENTS

| | | |
|---|---|---|
| 5,449,541 A | 9/1995 | Lipp et al. |
| 6,942,712 B2 * | 9/2005 | Hamanaka et al. ............ 55/523 |
| 7,056,365 B2 * | 6/2006 | Ichikawa et al. ............. 55/523 |
| 2004/0045267 A1 * | 3/2004 | Ichikawa et al. ............. 55/523 |
| 2004/0081848 A1 * | 4/2004 | Hijikata ...................... 428/593 |
| 2005/0079975 A1 * | 4/2005 | Fujita ......................... 502/439 |
| 2006/0021310 A1 * | 2/2006 | Ohno et al. ................... 55/523 |

OTHER PUBLICATIONS

Patent Abstracts of Japan, vol. 18, No. 465, Aug. 30, 1994 & JP 06 146849 A (NGK Insulators Ltd), May 27, 1994 abstract.

* cited by examiner

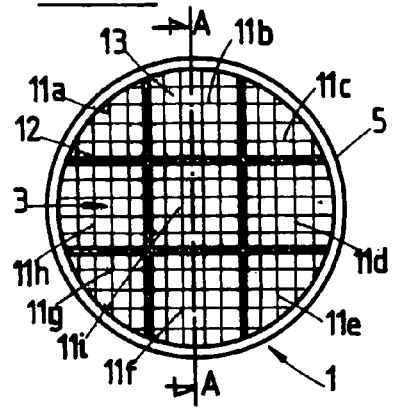
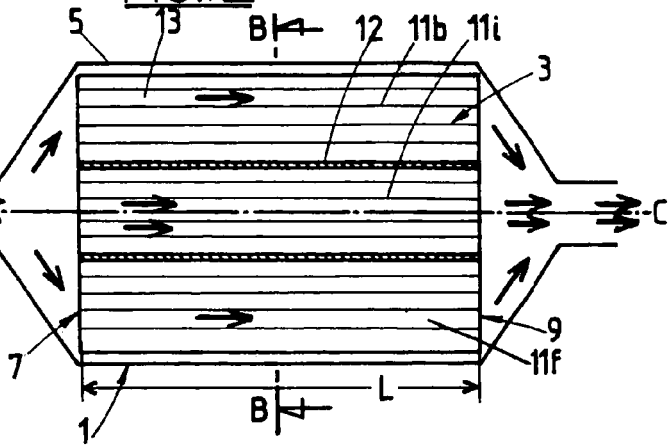
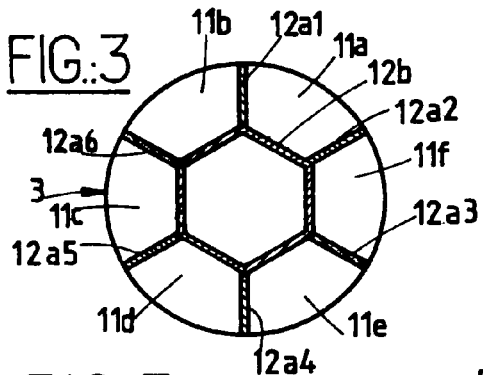
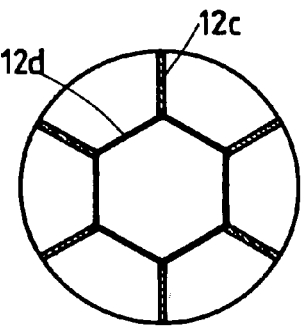
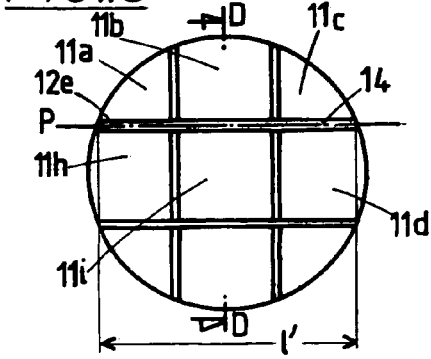
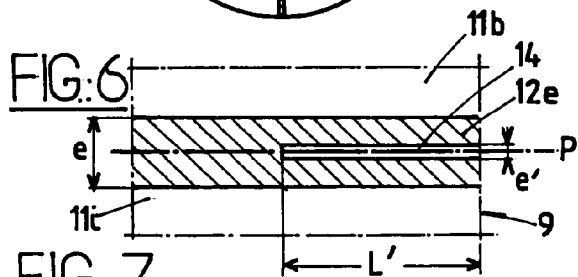
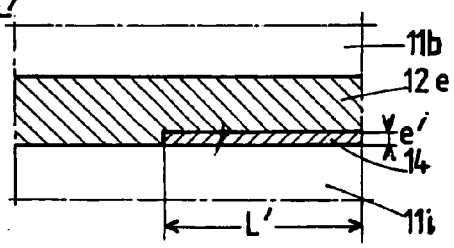

FILTERING BODY COMPRISING A PLURALITY OF FILTERING UNITS, IN PARTICULAR DESIGNED FOR A PARTICULATE FILTER

BACKGROUND OF THE INVENTION

The invention relates to a filtering body, in particular designed for a particulate filter for exhaust gases from an internal combustion engine of an automobile vehicle, and comprising a plurality of filtering units fastened together by means of at least one joint interleaved between said filtering units and conformed to oppose the passage of said exhaust gases between said filtering units.

DESCRIPTION OF THE RELATED ART

Before being evacuated to the atmosphere, the exhaust gases may be purified by means of a particulate filter such as that shown in FIGS. 1 and 2; this is known in the art.

FIG. 1 shows a particulate filter 1 in cross section on the section plane B—B shown in FIG. 2 and FIG. 2 shows it in longitudinal section on the section plane A—A shown in FIG. 1.

The particulate filter 1 conventionally comprises at least one filtering body 3 inserted into a metal enclosure 5 so that the exhaust gases necessarily pass through it from an upstream face 7 to a downstream face 9. The arrows show the direction of flow of the exhaust gases.

The filtering body 3 generally comprises a plurality of filtering units 11a–11i consisting of honeycomb porous structures, conventionally of ceramic (cordierite, silicon carbide, etc) and assembled together by bonding them by means of ceramic cement joints 12. The joints 12 are conventionally about 1 mm thick. After sintering, the ceramic cement, generally consisting of silica and/or silicon carbide and/or aluminum nitride, has a Young's modulus of approximately 5 000 MPa.

The resulting assembly may then be machined to the required section, for example a round or oval section.

A filtering unit 11a–11i comprises a plurality of passages 13 that may have cross sections of different shapes and different diameters. Each passage 13 is blocked at one end or the other. The exhaust gases are therefore constrained to pass through the walls of the passages 13, whereas particles to be filtered are held back.

After a certain time of use, particles that have accumulated in the passages of the filtering body 3, in particular on the upstream face 7, and are also known as "soot", increase the head loss caused by the filtering body 3, and therefore degrade the performance of the engine. For this reason, the filtering body must be regenerated regularly, for example every 500 kilometers.

Regeneration, which is also known as "decoking", entails oxidizing the soot. To do this, it is necessary to heat the soot to a temperature at which it ignites.

The operation of the particulate filter 1 causes differential heating of different areas of the filtering body 3, especially during regeneration phases.

During these phases, the regions of the filtering body 3 in the vicinity of the downstream face 9 are hotter than those in the vicinity of the upstream face 7, because the exhaust gases transport in the downstream direction all of the heat energy given off by the combustion of the soot.

Moreover, given the shape of the particulate filter 1, and the resulting path of the exhaust gases, as symbolized by the broad arrows, soot does not necessarily accumulate homogeneously; for example, it may accumulate predominantly in the region of the filter in the vicinity of its longitudinal axis C—C, also known as the "heart" of the filtering body 3. The combustion of the soot therefore causes a higher temperature rise in the heart of the filtering body 3 than in the peripheral regions.

The path of the hot exhaust gases and the cooling of the metal enclosure 5 by the surrounding air also lead to higher temperatures in the heart of the filtering body 3 in the absence of combustion of soot, although to a lesser degree.

The non-homogeneous nature of the temperatures within the filtering body 3, and possible differences in the nature of the materials used for the filtering units 11a–11i and the joints 12, generate local expansion by different amounts.

To prevent any circulation of unfiltered gas between the upstream face 7 and the downstream face 9, the interfaces between the filtering bodies 3 and the enclosure 5 and between the filtering bodies 3 and the joints 12 must nevertheless remain impermeable to the gases.

Furthermore, the particulate filter 1 is mounted in an exhaust system and excessive deformation must therefore be avoided, because of the risk of degrading the operation of the system, for example by creating leaks.

The resulting high thermomechanical stresses can cause cracks in the joints and/or in the filtering units 11a–11i, reducing the service life of the particulate filter 1.

To limit the risk of these cracks appearing, it is known in the art to select the cement of the joint 12 as a function of its capacity to ensure cohesion of the filtering units 11a–11i and its thermal conductivity. For example, the patent application WO 01/23069 (Ibiden) proposes to use a joint whose thickness is chosen in the range from 0.3 to 3 mm and which is made from a cement having a thermal conductivity from 0.1 to 10 W/m.K.

However, a joint of this kind does not completely eliminate the risk of cracks appearing.

SUMMARY OF THE INVENTION

The object of the invention is to provide a new method of assembling filtering units adapted to reduce this risk further.

That object is achieved by means of a filtering body, in particular for a particulate filter for exhaust gases from an internal combustion engine of an automobile vehicle, comprising a plurality of filtering units fastened together by means of at least one joint interleaved between said filtering units and conformed to oppose the passage of said exhaust gases between said filtering units.

The filtering body is noteworthy in that said joint comprises a plurality of joint portions locally adapted to optimize the attenuation of thermomechanical stresses liable to be generated in said filtering body.

According to other features of the filtering body of the invention:
- at least two of said joint portions comprise materials differing in their composition and/or their structure and/or their thickness;
- said materials of said joint portions have Young's moduli differing by an amount greater than or equal to 10%;
- at least one of said joint portions has anisotropic elasticity properties;
- said joint portion comprises a silica fabric impregnated with a cement;
- the thicknesses of at least two of said joint portions differ in a ratio of at least two to one;

at least one of said joint portions comprises a slot;
said slot opens onto either the upstream face or the downstream face of said filtering body;
said slot is formed in a plane substantially parallel to the faces of said filtering units assembled by said joint portion;
the length or "depth" of said slot is from 0.1 to 0.9 times the total length of said filtering body;
said slot is substantially adjacent a face of one of said filtering units;
said slot is at least partly filled with a filler material that does not adhere to said filtering unit or to the cement of said joint portion in which it is formed;
filler material is boron nitride or silica.

The invention also provides a particulate filter, intended in particular for filtering exhaust gases from an internal combustion engine of an automobile vehicle, comprising an enclosure and a filtering body obtained, in accordance with the invention, by assembling a plurality of filtering units by means of a joint.

BRIEF DESCRIPTION OF THE DRAWINGS

Other features and advantages of the present invention will become apparent on reading the following description and examining the appended drawings, in which:

FIG. 1 represents a prior art particulate filter in cross section on the section plane B—B represented in FIG. 2;

FIG. 2 represents the same particulate filter in longitudinal section on the section plane A—A represented in FIG. 1;

FIGS. 3 and 4 represent in cross section filtering bodies conforming to first and second embodiments of the present invention;

FIG. 5 represents a left-hand lateral view, i.e. a view with the downstream face 9 visible, of a filtering body conforming to a third embodiment of the present invention;

FIG. 6 represents, in longitudinal section on the section plane D—D represented in FIG. 5, a detail of the filtering body represented in FIG. 5; and FIG. 7 represents, in longitudinal section, a detail of a filtering body conforming to a fourth embodiment of the present invention.

DESCRIPTION OF THE PREFERRED EMBODIMENTS

The figures use the same reference symbols to denote identical or similar items.

For improved clarity, the passages 13 are not shown in FIGS. 3, 4, and 5.

In the remainder of the description, a distinction is made between "joint portions" of the joint 12. The term "joint portion" refers to a continuous fraction of the joint 12 having substantially constant properties.

The contiguous joint portions of the same filtering body 3 form a single joint 12.

In a first embodiment of the invention, represented in FIG. 3, two different assembly cements are used to bond the filtering units 11a–11i of a filtering body 3. The two cements used have different Young's moduli. A difference in Young's moduli of 10% or greater is considered to be significant, i.e. indicative of different behavior rather than linked to variations in measurements or to "normal" variations caused by the heterogeneous nature of a material.

In the regions subjected to the highest thermomechanical stresses, joint portions $12a_1$, $12a_2$, $12a_3$, $12a_4$, $12a_5$ and $12a_6$ are used comprising a first cement having a Young's modulus less than 1 000 MPa. In the other regions, a joint portion 12b is used, comprising a second cement used in the prior art and having a Young's modulus of about 5 000 MPa.

The first cement is more elastic than the second and is therefore better able to absorb without cracking variations in the volume of the filtering units that it separates. The first cement also limits the transmission of stresses between the filtering units 11a–11i and thus advantageously contributes to limiting the appearance of cracks in these units.

It is possible to reduce the Young's modulus of a cement, for example by increasing its total porosity by means of porogenic additives.

The second cement has better adhesion properties under the conditions of operation of the filter than the first cement. The combination of joint portions comprising the first cement with other joint portions comprising the second cement therefore yields a filtering body 3 that is robust and adapted to high thermomechanical stresses.

The filtering units 11a–11i, and in particular the filtering units 11a–11i disposed at the periphery of the filtering body 3, are advantageously conformed and arranged so that the joint portions $12a_{1-6}$ separating them are disposed radially. This improves the absorption of radial stresses by the joint portions $12a_{1-6}$.

In another embodiment of the invention, the cement of at least one of the joint portions has an isotropic Young's modulus. For example, it is possible to use a woven silica fabric impregnated with a standard cement. The woven element shows anisotropic behavior and structure and the cement with which it is impregnated provides the standard assembly functions.

This anisotropic behavior makes it possible to give preference to the elasticity in one or more directions. The silica fabric is advantageously disposed so that the Young's modulus of the joint portion is lower in the longitudinal direction.

In another embodiment of the invention, represented in FIG. 4, a joint thickness is used that varies according to the amplitude of the thermomechanical stresses to which it is liable to be subjected.

It is considered that the thickness of a joint portion 12c located in a region subject to the maximum thermomechanical stresses must be at least twice the thickness of a joint portion 12d used in a region subjected to the minimum thermomechanical stresses.

The cements constituting the joint portions, even those used to fabricate the conventional joint portion 12b, have Young's moduli much lower, by the order of a factor of 10, than those of the filtering units 11a–11i. This means that their capacity to absorb stresses is much higher than that of the latter units.

Increasing the thickness of the more elastic materials therefore helps stress relief.

In another embodiment, represented in FIGS. 5 and 6, a joint portion 12e comprises a slot 14 of length L' disposed to limit the transmission of stresses through the joint portion 12e.

The slot 14 preferably opens onto either the upstream face 7 or the downstream face 9.

The downstream face 9 being subjected to the highest thermomechanical stresses during regeneration, it is again preferable if the slot 14 is formed on the downstream face 9.

Of course, to prevent the exhaust gases passing through the filtering body 3 without being filtered, the slot 14 does not open onto both the upstream face 7 and the downstream face 9. On the other hand, the slot 14 could be closed.

The slot 14 is preferably formed across the whole width 1' of the joint portion 12e, as represented in FIG. 5. The slot 14 is preferably centered in a median plane P parallel to the faces of the adjacent filtering units 11a and 11h, 11b and 11i, and 11c and 11d fastened together by the joint portion 12e.

The length (or "depth") L' of the slot 14 is preferably from 0.1 to 0.9 times the total length L of the filtering body 3. It is found that, for ratios L'/L less than 1/10, there is no significant effect, while for ratios L'/L greater than 9/10, the mechanical cohesion of the filtering body 3 is insufficient.

To form the slot 14, a sheet of paper may be introduced into the thickness of the joint portion 12e before the sintering step, for example. The sheet of paper will be burned during heating, leaving behind the slot 14.

As in the embodiment represented in FIG. 7, the slot 14 may also be formed by the depositing on the surface of a filtering unit 11i a material that does not adhere to the unit or which does not adhere to the cement of the joint portion 12e or which does not adhere to either of these.

This material may be boron nitride, for example, deposited by means of an aerosol or a refractory felt, for example a bed of fibers. This material is deposited on the filtering unit 11i before applying the cement of the joint portion 12e and before the sintering step. The resulting slot 14 is adjacent the filtering unit 11i.

Filling the slot 14 with a material such as boron nitride advantageously improves the conduction of heat energy between the filtering unit 11i and the joint portion 12e.

For the reasons previously stated, the length L' of the slot 14 must also be from 0.1 to 0.9 times the total length L of the filtering body 3.

Of course, the present invention is not limited to the embodiments represented and described hereinabove, which are provided by way of illustrative and nonlimiting example.

Thus the same filtering body 3 may combine features of more than one of the embodiments of the invention described hereinabove. For example, a filtering body 3 may comprise a plurality of joint portions of different kinds, comprise slotted joint portions, etc.

The invention claimed is:

1. Filtering body, in particular for a particulate filter (1) for exhaust gases from an internal combustion engine of an automobile vehicle, comprising a plurality of filtering units (11a–11i) fastened together by means of at least one joint (12) interleaved between said filtering units (11a–11i) and conformed to oppose the passage of said exhaust gases between said filtering units (11a–11i),
    characterized in that said joint (12) comprises a plurality of joint portions (12a–12e) locally adapted, said local adaptation being so that at least two of said joint portions (12a, 12b; 12c, 12d) comprise materials differing in their composition and/or their structure and/or their thickness, and/or so that at least one of said joint portions (12e) comprises a slot (14).

2. Filtering body according to claim 1, characterized in that said materials of said joint portions (12a, 12b) have Young's moduli differing by an amount greater than or equal to 10%.

3. Filtering body according to claim 1, characterized in that at least one of said joint portions has anisotropic elasticity properties.

4. Filtering body according to claim 3, characterized in that said joint portion comprises a silica fabric impregnated with a cement.

5. Filtering body according to claim 1, characterized in that the thicknesses of at least two of said joint portions (12c, 12d) differ in a ratio of at least two to one.

6. Filtering body according to claim 1, characterized in that said slot (14) opens onto either the upstream face (7) or the downstream face (9) of said filtering body (3).

7. Filtering body according to claim 6, characterized in that said slot (14) opens onto said downstream face (9) of said filtering body (3).

8. Filtering body according to claim 1, characterized in that said slot (14) is formed in a plane (P) substantially parallel to the faces of said filtering units (11b, 11i) assembled by said joint portion (12e).

9. Filtering body according to claim 1, characterized in that the length L' of said slot (14) is from 0.1 to 0.9 times the total length L of said filtering body (3).

10. Filtering body according to claim 7, characterized in that said slot (14) is substantially adjacent a face of one of said filtering units (11i).

11. Filtering body according to claim 9, characterized in that said slot (14) is at least partly filled with a filler material that does not adhere to said filtering unit (11i) or to the cement of said joint portion (12e) in which it is formed.

12. Filtering body according to claim 11, characterized in that said filler material is boron nitride or silica.

13. Particulate filter, intended in particular for filtering exhaust gases from an internal combustion engine of an automobile vehicle, comprising an enclosure (5) and a filtering body (3) obtained by assembling a plurality of filtering units (11a–11i) by means of a joint (12), characterized in that said filtering body (3) conforms to claim 1.

* * * * *